United States Patent [19]

Letson

[11] Patent Number: 5,347,746
[45] Date of Patent: Sep. 20, 1994

[54] FISHING TACKLE BOX INCLUDING ACCESSORY HOLDERS

[76] Inventor: Marshall G. Letson, 731 Chestnut St., Mt. Carmel, Ill. 62863

[21] Appl. No.: 93,649

[22] Filed: Jul. 20, 1993

[51] Int. Cl.$^5$ ............................................. A01K 97/06
[52] U.S. Cl. ................................ 43/57.1; 206/315.11; 220/772
[58] Field of Search ............ 43/57.1, 21.2, 55, 54.1; 206/315.11, 372, 373; 220/772, 768, 763

[56] References Cited

U.S. PATENT DOCUMENTS

| | | | |
|---|---|---|---|
| D. 190,429 | 5/1961 | Hoagland | 43/21.2 |
| 417,979 | 12/1889 | Borcherdt | 43/57.1 |
| 2,555,073 | 5/1951 | Zdonkoski | 43/57.1 X |
| 2,572,706 | 10/1951 | Eichholz et al. | 206/373 |
| 2,936,066 | 5/1960 | Meksula | 206/315.11 X |
| 3,555,719 | 1/1971 | Butler | 43/21.2 X |
| 4,170,801 | 10/1979 | Ward | 206/315.11 |
| 4,841,660 | 6/1989 | James | 45/21.2 |
| 5,011,013 | 4/1991 | Meisner et al. | 206/373 |

Primary Examiner—P. Austin Bradley
Assistant Examiner—Jeanne M. Elpel
Attorney, Agent, or Firm—Paul M. Denk

[57] ABSTRACT

A tackle box includes a top portion which is pivotally secured to a bottom portion to be movable between an open position and a closed position. The top and bottom each include front, back, and side walls. The top has a top wall and the bottom has a bottom wall. The front wall of the bottom portion has a pair of clamps arranged to hold a fishing net. The top has clips arranged thereon to hold fishing rods, a plurality of handles, and a pair of legs hingedly secured to the top. The legs are pivoted to support the top when it is in its open position. A plurality of compartments are removable received in the bottom portion for holding cold food or beverages, live bait, tackle, and large equipment.

11 Claims, 2 Drawing Sheets

FISHING TACKLE BOX INCLUDING ACCESSORY HOLDERS

BACKGROUND OF THE INVENTION

This invention relates to fishing tackle boxes, and in particular, to a tackle box which can carry a plurality of items to reduce the amount of equipment a fisherman must carry.

When fishing, fisherman carry a tackle box, fishing rods, fishing nets, bait, lures, hooks, a cooler, etc. When all this equipment is spread out in multiple packages which must be carried, the fisherman must move from place to place in a series of moves.

SUMMARY OF THE INVENTION

One object of the present invention is to provide a tackle box in which a fisherman can carry substantially all his supplies.

Other objects will become apparent to those skilled in the art in light of the following disclosure and accompanying drawings.

Briefly stated, a fishing tackle box of the present invention includes a bottom portion having a front wall, a back wall, a bottom, and side walls, defining an inner space. Clips are secured to the outside of the front wall for holding a fishing net. A top portion is hingedly connected to the bottom portion to cover and close the inner space. The top portion is movable between a first position in which it covers the bottom portion and a second position in which the bottom portion is opened. The top portion including a front wall, a back wall, side walls, and a top to define an inner space. Two pair of clips are secured to the outside of the top wall to holding fishing rods. Three pair of clips are secured to the inside of the top wall to hold further fishing rods. The clips are aligned to be generally parallel to the front wall. Three handles are secured to the top wall to facilitate carrying of the tackle box. One of the handles is generally parallel to the longitudinal axis of the top and is centered. The other two handles are spaced slightly inwardly from the side walls and are generally parallel to the side walls. A pair of legs are pivotally secured to the top wall. The legs are sized and shaped to support said top portion when it is in its open position.

A plurality of compartments are removably housed in the inner space to store fishing equipment. The compartments include a cooler, a live bait compartment, a shallow tray, and a deep tray. The deep tray is substantially as deep as the tackle box, whereas the shallow tray is substantially shallower than the tackle box. The shallow tray can have two or more compartments formed therein.

DESCRIPTION OF THE PREFERRED EMBODIMENT

Figure 1:
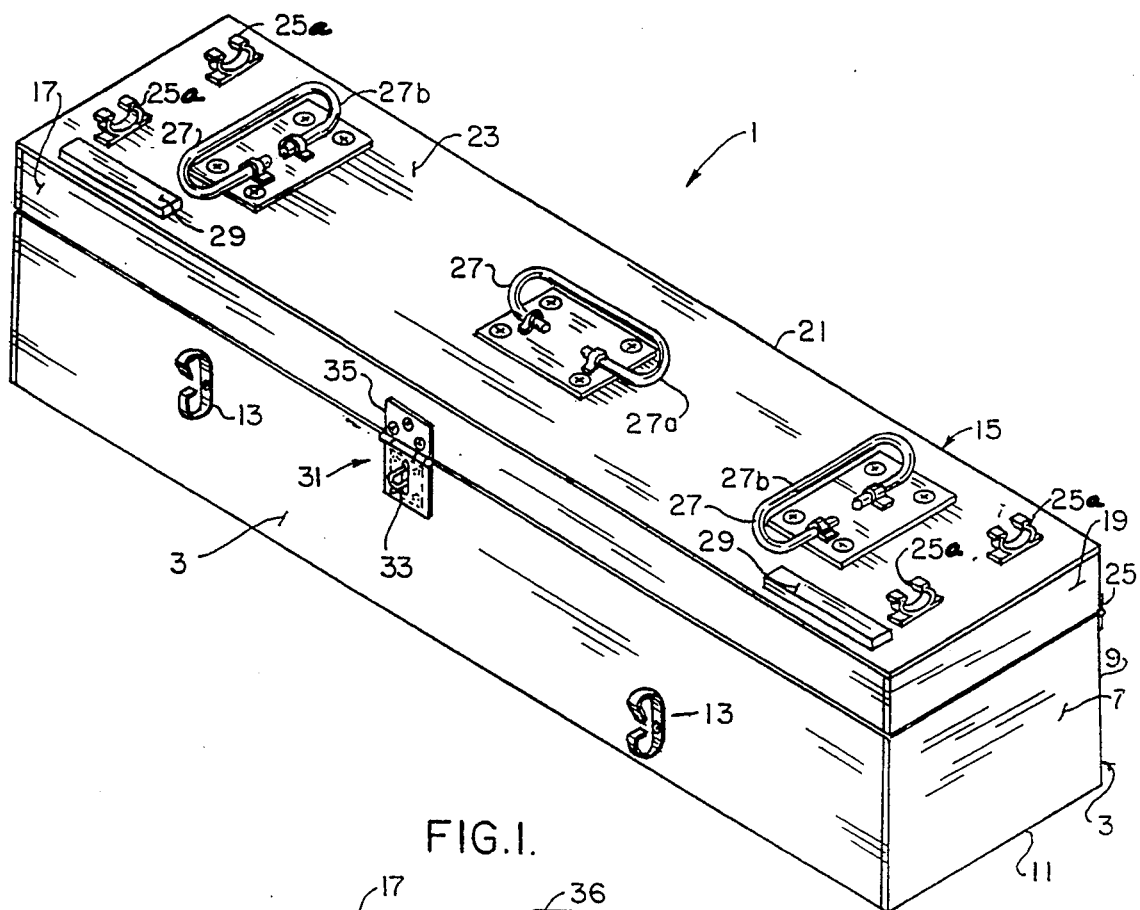
FIG. 1 is a perspective view of a tackle box of the present invention.
Figure 2:
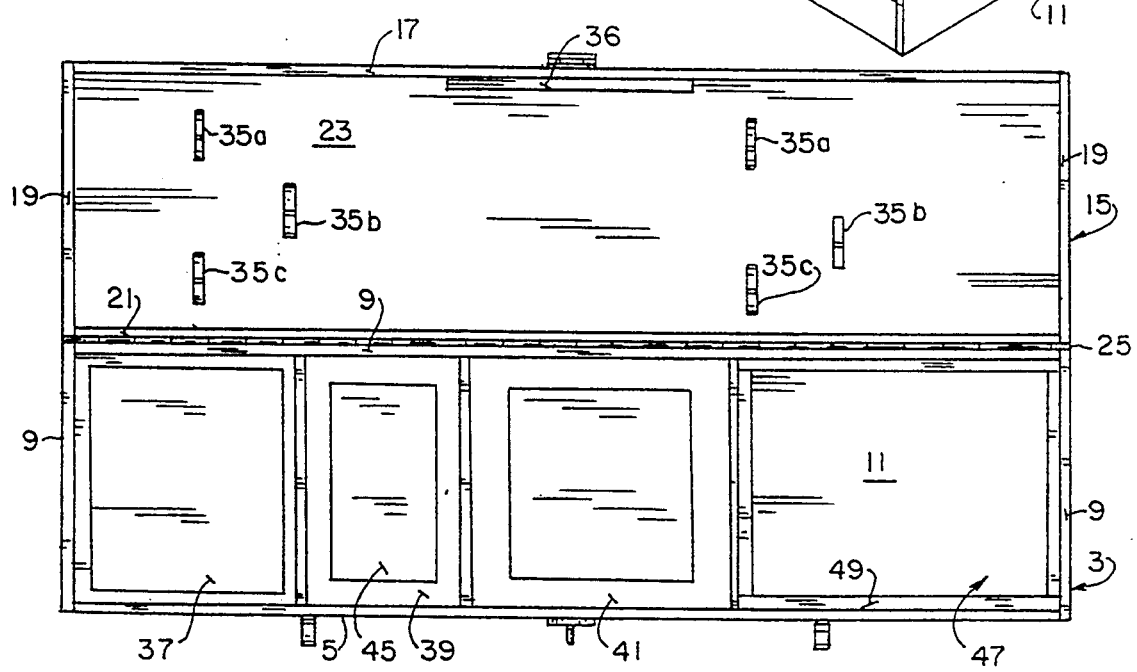
FIG. 2 is a top plan view of the tackle box when it is opened.

A tackle box 1 of the present invention is shown in FIGS 1 and 2. Tackle box 1 is preferably a large tackle box having so that nearly everything a fisher may need can be carried by the tackle box. The preferred dimensions of the box are 41" long by 11" deep by 9.5" high. These dimensions of course can be altered to suit one's needs.

Box 1 includes a bottom part 3 that is about 7" deep and includes a front wall 5, side walls 7, a back wall 9, and a bottom 11. A pair of clamps or clips 13 are secured to front wall 5. Clamps 13 are spaced inwardly from the edges of the front wall and said clamp are horizontally offset from each other so that a line through their centers extends diagonally across front wall 5. Clamps 13 are preferably 1 5/8" holding clamps. This size clamp is sufficiently large to receive the rod of a fishing net to hold the fishing net. Other size clamps could be used to support other sized nets.

A cover 15 is mounted on bottom 3. Top 15 has a front wall 17 side walls 19, a back wall 21, and a top 23. Cover 15 is preferably about 2.5" deep. It is mounted on bottom 3 by a hinge 25. Hinge 25 is preferably a 1.5" piano hinge that extends the full length of the tackle box. Hinge 25 allows cover 15 to fully open so that the bottom of side walls 19 are even with the rod of side walls 9 when fully opened to allow easy access to the interior of both the cover 15 and bottom 3.

Four clips 25a are mounted to the outside of top 23. Clips 25 are arranged to be used in pairs to hold fishing rods to the top of tackle box 1. Clips 25a are preferably spring clips which snappingly receive the rod to hold the rod in place.

Three handles 27 are mounted to top 23 to facilitate carrying of tackle box 1. The handles are preferably folding handles. One of the handles 27a is mounted generally in the center of top 23 and extends generally parallel to the front and back walls. The other two handles 27b are spaced inwardly from the side walls and are generally parallel to the side walls. The two side handles can be used to attach a shoulder strap to the tackle box or to enable two people to carry the box at once. Fishing rod clips 25 are preferably mounted on top 23 so that fishing rods will not interfere with the use of the side handles 27b.

A pair of legs 29 are hingedly mounted to top 23 slightly inwardly from front wall 17 and side walls 19. Legs 29 lie flat on top 23, as seen in FIG. 1, when box 1 is closed. When box 1 is opened, legs 29 pivot away from top 3. The legs are sized to extend to the ground, or other base upon which box 1 is placed, when the box is opened to provide support for the cover. Support legs 29 also protect hinge 25 in that it prevents the hinge from being hyperextended when the box is opened on a level surface.

A latch assembly 31 is secured to the front of tackle box 1 so that it may be locked. Latch assembly includes a latch plate 33 secured to bottom front wall 5 and a latch cover 35 hingedly secured to cover front wall 17. As is known, latch plate 33 has a loop and cover 35 has a slot through which the loop extends.

Tackle box 1 is shown in its open position in FIG. 2. Three pair of clips 35a-c, identical to clips 25a, are secured to the inside of top 23 to hold more fishing rods. The pairs of clips are all equally spaced apart, but are arranged in an alternating manner, as is clearly seen in FIG. 2. A support lip 36 is secured to the inside of cover front wall 17. The bottom of lip 36 is even with the bottom of wall 17. Lip 36 provides support for cover 15 when the tackle box is closed. A plurality of containers or compartments 37, 39, 41, and 43 are received in bottom 3 to hold various items as will be explained.

Container 37 is a deep container which is preferably as deep as bottom 3, i.e. about 7" deep, and about 9" wide. Container 37 can be used to store large items such as spools of fishing string, large lures, etc.

Container 39 is a cooler which can be used to store food and beverage. Cooler 39 is preferably about 6.25"×10.5" by 7" in overall dimensions. It includes insulation and has a lid. Preferably it has a storage area 45 that is 4.5"×9"×6.25".

Container 41 is a live bait box having insulated walls thick. The storage area of bait box 41 is preferably about 9"×9"×6.25".

Figure 4:
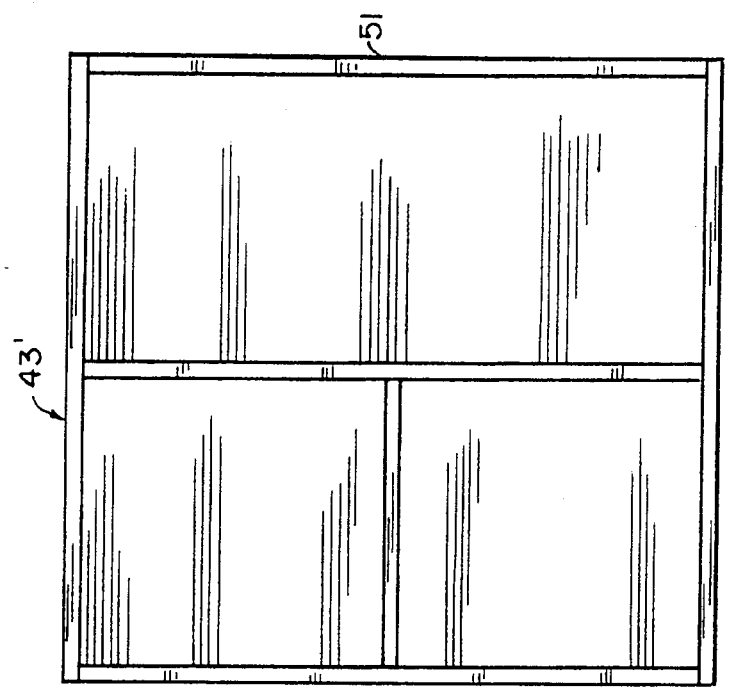
FIG. 4 is a plan view of a second alternative tray.
Figure 3:
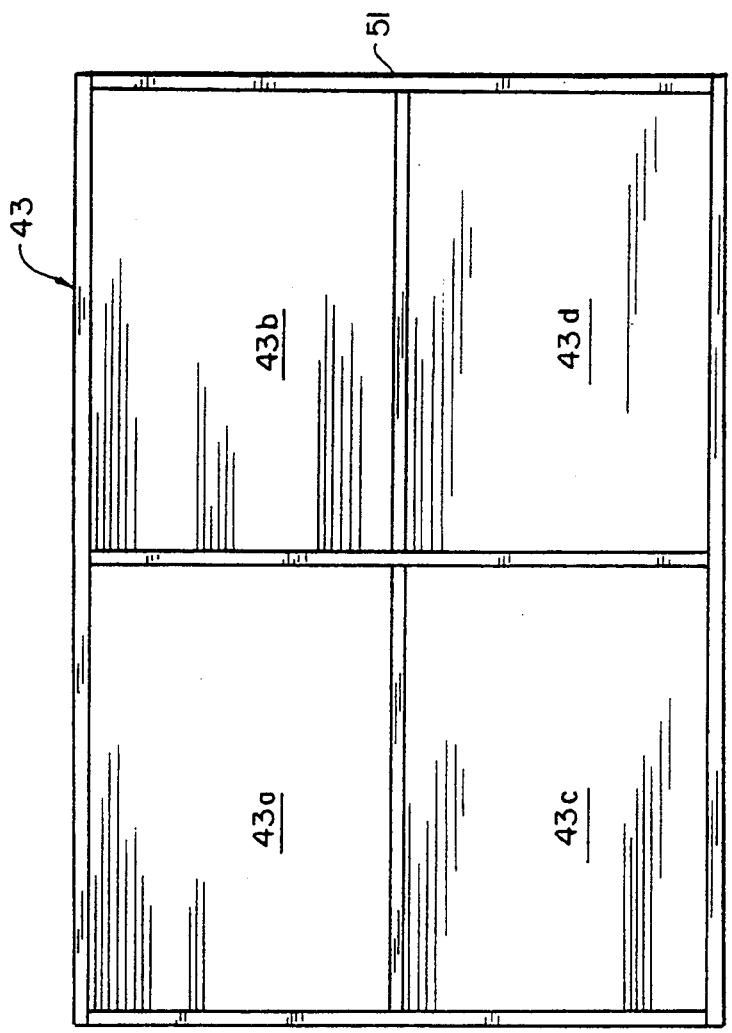
FIG. 3 is a plan view of an alternative tray for use with the tackle box.

Container 43 is a shallow removable tray which may be used to store items such as hooks, sinkers, lures, etc. Variations of tray 43 are shown in FIGS. 3 and 4. Tray 43 is removably received in area 47 of bottom 3. Area 47 has a circumferential lip 49. Tray 43 has a circumferential flange 51 which rests on lip 49 to support tray 43 in area 47. Tray 43 may be divided into multiple compartments. Tray 43 in FIG. 3 is divided into four evenly sized compartments 43a–d. All the compartments are preferably about 1.5" deep. Container 43', shown in FIG. 4, is divided into three sections. One of the sections comprises a full half of the tray. The other two sections each comprise a quarter of the tray. Tray 43 is also preferably about 1.5" deep. Of course, tray 43 can be made to be any desired depth and can be designed to have a plurality of compartments in a variety of configurations. It also is removably received in the tackle box.

As can be appreciated, tackle box 1 can carry nearly everything a fisher needs when fishing, enabling him to more easily carry his fishing gear. As variations within the scope of the appended claims may be apparent to those skilled in the art, the foregoing description is meant to be illustrative only, and is not meant to be limiting.

I claim:

1. A fishing tackle box having:
   a bottom portion having a front wall, a back wall, a bottom wall, and side walls, defining an inner space, said walls also having exterior surfaces;
   a first clip secured to the exterior of the front wall for holding a fishing accessory;
   said tackle box having a top portion hingedly connected to the bottom portion to cover and close the inner space of the said bottom portion, the top portion being removable between a first position in which it covers the bottom portion into closure, and a second position in which the bottom portion is opened, the top portion including a front wall, a back wall, side walls, and a top wall, said walls also having exterior surfaces;
   at least one pair of second clips secured to the exterior surface of the top wall for holding a fishing rod, said second clips being aligned to be generated parallel to the front wall of the top portion;
   there being two legs pivotally secured to the top portion of the top wall, said legs being pivoted into a supporting position when the top portion is pivoted about its hinge into an open portion;
   a plurality of compartments housed in said inner space of the bottom portion and in which fishing equipment may be stored; and
   there being a plurality of handles secured to the exterior of the top wall of the top portion to facilitate carrying of the fishing tackle box during usage.

2. The tackle box of claim 1 wherein one of said handles securing to the top wall is generally parallel to the longitudinal axis of the tackle box.

3. The tackle box of claim 2 wherein there are three handles secured to the exterior surface of the top wall of the tackle box, two of said three handles are generally perpendicular to said longitudinal axis of the tackle box.

4. The tackle box of claim 3 wherein said two handles are positioned near the side walls of said top portion of said top wall, and one handle is positioned substantially in the center of said top wall of said top portion.

5. The tackle box of claim 4 wherein said second clips are secured to the top portion of said top wall in between the outer handles and the side walls of said top portion.

6. The tackle box of claim 5 wherein there are two pair of second clips.

7. The tackle box of claim 5 wherein there are two first clips on the front wall, the fishing accessory holding first clips are two spaced clips, one of the clips being positioned vertically, spaced from the other of said first clips.

8. The tackle box of claim 7 wherein the compartments includes a cooler, a live bait compartment, a shallow tray, and a deep tray, said compartments being positioned within the bottom portion of the tackle box.

9. The tackle box of claim 8 wherein said deep tray is substantially as deep as the tackle box.

10. The tackle box of claim 8 wherein said shallow tray has two or more compartments formed therein.

11. The tackle box of claim 8 wherein the compartments are removably received in the tackle box inner space.

* * * * *

UNITED STATES PATENT AND TRADEMARK OFFICE
CERTIFICATE OF CORRECTION

PATENT NO. : 5,347,746

DATED : September 20, 1994

INVENTOR(S) : Letson, Marshall G.

It is certified that error appears in the above-identified patent and that said Letters Patent is hereby corrected as shown below:

Claim 1, column 4, line 6, change "generated" to ---generally---; line 11, change "portion" to ---position---.

Signed and Sealed this

Twenty-ninth Day of November, 1994

Attest:

BRUCE LEHMAN

*Attesting Officer*    *Commissioner of Patents and Trademarks*